(12) United States Patent
Gucea et al.

(10) Patent No.: US 11,711,809 B2
(45) Date of Patent: Jul. 25, 2023

(54) SYSTEM AND METHOD FOR PROVIDING AN ENHANCED ACKNOWLEDGEMENT FRAME

(71) Applicant: NXP USA, Inc., Austin, TX (US)

(72) Inventors: Doru Cristian Gucea, Bragadiru Village (RO); Khurram Waheed, Austin, TX (US); Marius Preda, Bucharest (RO); Yaoqiao Li, Suzhou (CN)

(73) Assignee: NXP USA, Inc., Austin, TX (US)

( * ) Notice: Subject to any disclaimer, the term of this patent is extended or adjusted under 35 U.S.C. 154(b) by 25 days.

(21) Appl. No.: 17/444,324

(22) Filed: Aug. 3, 2021

(65) Prior Publication Data

US 2022/0210809 A1 Jun. 30, 2022

(30) Foreign Application Priority Data

Dec. 30, 2020 (RO) ................................ a 2020 00863

(51) Int. Cl.
*H04W 72/00* (2023.01)
*H04W 72/20* (2023.01)
(Continued)

(52) U.S. Cl.
CPC ........... *H04W 72/20* (2023.01); *H04L 1/1678* (2013.01); *H04L 5/0055* (2013.01);
(Continued)

(58) Field of Classification Search
CPC ............. H04W 72/12; H04W 72/1278; H04W 72/1289; H04W 72/1294; H04W 72/1263;
(Continued)

(56) References Cited

U.S. PATENT DOCUMENTS

| 6,175,859 B1 * | 1/2001 | Mohler | H04L 51/23 |
| | | | 709/206 |
| 2003/0084175 A1 * | 5/2003 | Kaniyar | H04L 69/28 |
| | | | 709/227 |

(Continued)

FOREIGN PATENT DOCUMENTS

| CN | 102508698 | * | 9/2011 | ............... G06F 9/46 |
| WO | WO2021/090298 | * | 5/2021 | ............... H04L 1/18 |

OTHER PUBLICATIONS

Robert F Heile, IEEE Standard for Low-Rate Wireless Networks, 2016m IEEE, IEEE Std 802.15.4-2015 edition, pp. 13, 52, 170 (Enhanced ACK) (Year: 2016).*

(Continued)

*Primary Examiner* — Warner Wong

(57) ABSTRACT

A system for providing an enhanced acknowledgement (ENH-ACK) frame is configured to receive an incoming packet transmitted by an external device, determine that an ENH-ACK response is required based on a MAC header of the incoming packet schedule transmission of the ENH-ACK frame to the external device in accordance with a standard turnaround time limit relative to receipt of the incoming packet, determine contents of one or more packet processed fields of the ENH-ACK frame and populate the one or more packet processed fields, and complete transmission of the ENH-ACK frame with the populated packet processed fields.

17 Claims, 8 Drawing Sheets

(51) Int. Cl.
*H04L 5/00* (2006.01)
*H04L 9/40* (2022.01)
*H04L 69/22* (2022.01)
*H04L 1/1607* (2023.01)
*H04L 69/28* (2022.01)

(52) U.S. Cl.
CPC .......... *H04L 63/0428* (2013.01); *H04L 69/22* (2013.01); *H04L 69/28* (2013.01)

(58) Field of Classification Search
CPC .... H04W 74/00; H04W 74/04; H04L 5/0001; H04L 5/0053; H04L 5/0055; H04L 63/04; H04L 63/0428; H04L 69/00; H04L 69/22; H04L 1/16; H04L 1/1607; H04L 1/1678; H04L 12/1868; H04L 51/23; H04L 1/1848; H04L 1/188; H04L 69/28; H04L 67/62; H04L 67/70
See application file for complete search history.

(56) References Cited

U.S. PATENT DOCUMENTS

| | | | | |
|---|---|---|---|---|
| 2005/0226273 | A1* | 10/2005 | Qian | H04L 1/1628 370/474 |
| 2009/0258632 | A1* | 10/2009 | Sun | H04W 4/12 455/466 |
| 2013/0336182 | A1* | 12/2013 | Asterjadhi | H04L 69/324 370/310 |
| 2016/0198453 | A1* | 7/2016 | Hu | H04W 24/02 370/349 |
| 2017/0171060 | A1* | 6/2017 | Liu | H04L 69/28 |
| 2017/0338938 | A1* | 11/2017 | Fang | H04B 3/46 |
| 2019/0068255 | A1* | 2/2019 | Bolotin | H04L 1/0003 |
| 2021/0152311 | A1* | 5/2021 | Dong | H04L 5/0007 |
| 2022/0225163 | A1* | 7/2022 | Sharma | H04W 28/06 |

OTHER PUBLICATIONS

Gomes et al.: "A 6LoWPAN Accelerator for Internet of Things Endpoint Devices," IEEE Internet of Things Journal, vol. 5, Issue 1, DOI 10.1109/JIOT.2017.2785659, Feb. 2018, pp. 371-377.

Gomes et al.: "Building IEEE 802.15.4 Accelerators for Heterogeneous Wireless Sensor Nodes", IEEE Sensors Letters, vol. 1, Issue: 1, DOI: 10.1109/LSENS.2017.2681625, Feb. 2017, pp. 1-4.

* cited by examiner

| Bits: 0–2 | 3 | 4 | 5 | 6 | 7 | 8 | 9 | 10–11 | 12–13 | 14–15 |
|---|---|---|---|---|---|---|---|---|---|---|
| Frame Type | Security Enabled | Frame Pending | AR | PAN ID Compression | Reserved | Sequence Number Suppression | IE Present | Destination Addressing Mode | Frame Version | Source Addressing Mode |

Figure 8

SYSTEM AND METHOD FOR PROVIDING AN ENHANCED ACKNOWLEDGEMENT FRAME

CROSS-REFERENCE TO RELATED APPLICATIONS

This application claims the priority under 35 U.S.C. § 119 of Romania application no. A100662020, filed on 30 Dec. 2020, the contents of which are incorporated by reference herein.

FIELD

The present disclosure relates to a system and method for providing an enhanced acknowledgement frame that is compliant with the turnaround requirements of IEEE 802.15.4-2015 while maintaining data integrity.

SUMMARY

According to a first aspect of the present disclosure there is provided a system for providing an enhanced acknowledgement, ENH-ACK, frame, the system configured to:
- receive an incoming packet transmitted by an external device;
- determine that an ENH-ACK response is required based on a MAC header of the incoming packet;
- schedule transmission of the ENH-ACK frame to the external device in accordance with a standard turnaround time limit relative to receipt of the incoming packet;
- determine contents of one or more packet processed fields of the ENH-ACK frame and populate the one or more packet processed fields; and
- complete transmission of the ENH-ACK frame with the populated packet processed fields.

The system can advantageously schedule transmission of the ENH-ACK frame using system hardware while system software prepares the one or more packet processed fields.

According to one or more embodiments, the system may be further configured to populate one or more header fields of the ENH-ACK frame based on the MAC header of the incoming packet.

Populating the one or more header fields of the ENH-ACK frame based on the MAC header can result in faster processing times enabling the turnaround time limit to be met.

According to one or more embodiments, the system may determine that an ENH-ACK response is required following receipt of MHR and prior to receipt of the whole of incoming packet.

According to one or more embodiments the system may populate steps commence one or more header fields of the ENH-ACK frame based on the MAC header of the incoming packet following receipt of MHR and prior to receipt of the whole of incoming packet.

According to one or more embodiments, the system may be configured to start a timer in response to receipt of the incoming packet and begin transmission of the ENH-ACK frame to the external device prior to expiry of the standard turnaround time limit indicated by the timer.

According to one or more embodiments the system may comprise a system clock. The system clock may for part of system hardware. The system may be configured to schedule transmission of the ENH-ACK frame based on the system clock.

According to one or more embodiments the system may be configured to determine a symbol arrival time of a predetermined symbol of the incoming packet using a system clock and determine the standard turnaround time limit based on the symbol arrival time.

According to one or more embodiments, the system is configured to determine the contents of the one or more packet processed fields as:
- calculated values of the one or more packet processed fields if system software determines the calculated values prior to expiry of a corresponding calculation deadline; or
- fallback values if the system software fails to determine the calculated values of the one or more packet processed fields prior to expiry of the corresponding calculation deadline.

Preparing fallback values for the one or more packet processed fields advantageously ensures that the a ENH-ACK compliant frame is always transmitted within the turnaround time limit.

According to one or more embodiments, the one or more packet processed fields may comprise a frame length field. The system may be configured to determine the contents of the frame length field as:
- a calculated frame length if system software determines the calculated frame length prior to expiry of a frame length calculation deadline; and
- a fallback frame length if the system software fails to determine the calculated frame length prior to expiry of the frame length calculation deadline.

According to one or more embodiments, the calculated frame length may be based on a total length of header fields and a payload length of an acknowledgment payload.

According to one or more embodiments, if the system software fails to determine the calculated frame length prior to expiry of the frame length calculation deadline the system may be configured to complete transmission of the ENH-ACK frame as an empty ENH-ACK frame without an acknowledgement payload.

According to one or more embodiments, the one or more header fields may include a frame control field. The system may be configured to:
- set a frame pending flag of the frame control field;
- transmit a payload ENH-ACK frame including an acknowledgement payload subsequent to transmission of the empty ENH-ACK frame and after calculated values of the frame length field and the acknowledgement payload have been determined.

According to one or more embodiments, the one or more packet processed fields may comprise an acknowledgment payload. The system may be configured to determine the contents of the acknowledgment payload as:
- calculated payload values of the acknowledgment payload if system software determines the calculated payload values prior to expiry of a payload calculation deadline; and
- a fallback payload if the system software fails to determine the calculated payload values of the acknowledgment payload prior to expiry of the payload calculation deadline.

According to one or more embodiments, the one or more header fields may include a frame control field. If the system software fails to determine the calculated payload values prior to expiry of the payload calculation deadline, the system may be configured to:

set a frame pending flag of the frame control field; and transmit a payload ENH-ACK frame including calculated payload values of the acknowledgement payload subsequent to transmission of the ENH-ACK frame and after the calculated payload values have been determined.

According to one or more embodiments, the system software may be configured to determine a calculated payload length of the acknowledgement payload. A fallback payload length of the fallback payload may be based on the calculated payload length.

According to one or more embodiments, the system may comprise system hardware and system software. The system software may be configured to perform one or more software frame processing steps to determine calculated values of the packet processed fields. The system may be configured to perform one or more or all of the other system operation steps using the system hardware.

According to one or more embodiments, the software frame processing steps may comprise one or more of:
- authenticating the incoming packet;
- decrypting the incoming packet;
- determining a calculated payload length of the acknowledgment payload;
- determining a calculated frame length of the ENH-ACK frame;
- determining calculated payload values of the acknowledgement payload;
- authenticating the acknowledgement payload; and
- encrypting the acknowledgement payload.

According to one or more embodiments, the system may be configured to perform one or more or all of the other system operation using the system software.

According to one or more embodiments, the system hardware may be configured to provide RAM buffers to the system software for preparing the packet processed fields.

According to one or more embodiments, the system may comprise system software, wherein the system is configured to perform all operations using the system software. The system may be configured to perform all operations using one or more system processors to execute the system software.

According to one or more embodiments, the one or more calculation deadlines may be implemented depending on a speed of a processor of the system.

According to one or more embodiments, the one or more calculation deadlines comprise a frame length calculation deadline and a payload calculation deadline.

According to one or more embodiments, the system may be configured to determine the payload calculation length based on a header length and a transmission bit rate.

According to a second aspect of the present disclosure there is provided a radio comprising any of the systems disclosed herein.

According to a third aspect of the present disclosure there is provided a system on chip comprising any of the radios or any of the systems disclosed herein.

According to a fourth aspect of the present disclosure there is provided a method for providing an enhanced acknowledgement, ENH-ACK, frame, the method comprising the steps:
- receiving an incoming packet transmitted by an external device;
- determining that an ENH-ACK response is required based on a MAC header of the incoming packet;
- scheduling transmission of the ENH-ACK frame to the external device in accordance with a standard turnaround time limit relative to receipt of the incoming packet;
- determining contents of one or more packet processed fields of the ENH-ACK frame and populating the one or more packet processed fields; and
- completing transmission of the ENH-ACK frame.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 8 illustrates the format of a frame control field of an ENH-ACK frame.

DETAILED DESCRIPTION

Acknowledgement (ACK) frames are sent via communication devices following receipt of a packet from another device that has requested an acknowledgement. The IEEE Standard for Low-Rate Wireless Networks, IEEE 802.15.4-2015, defines the protocol and compatible interconnection for data communication devices using low-data-rate, low-power, and low-complexity short-range radio frequency (RF) transmissions in a wireless personal area network (WPAN). The IEEE 802.15.4-2015 standard requires that a maximum turnaround time for an ACK frame is 192 microseconds (µs). The maximum turnaround time may also be referred to as an inter frame spacing (IFS).

An ACK frame may be an immediate ACK (IMM-ACK) frame or an enhanced ACK (ENH-ACK) frame.

Figure 1:
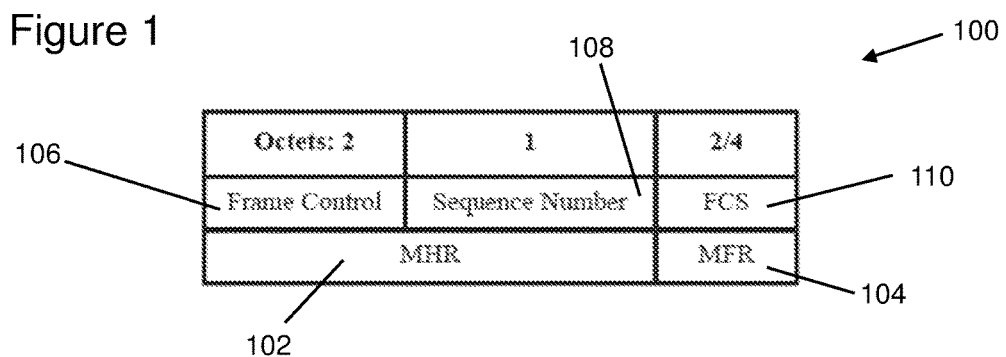
FIG. 1 illustrates the format of an IMM-ACK frame.

The format of an IMM-ACK frame 101 is illustrated in FIG. 1. The IMM-ACK frame 101 comprises a MAC (media access control) header (MHR) 102 and a MAC footer (MFR)

104. The MHR 102 comprises a frame control field 106 and a sequence number field 108. The MFR 104 comprises a frame check sequence (FCS) field 110. In many systems it is possible to generate the IMM-ACK frame 101 in hardware and easily meet the turnaround requirement of 192 µs.

Figure 2:
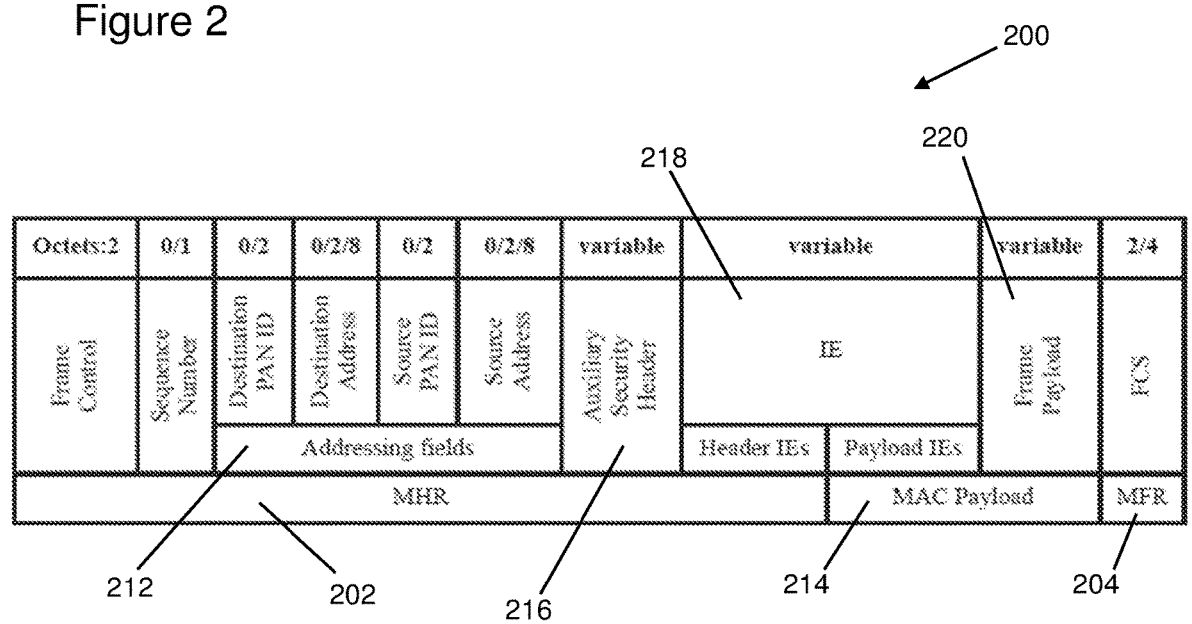
FIG. 2 illustrates the format of an ENH-ACK frame.

The format of an ENH-ACK frame 200 is illustrated in FIG. 2. In a similar way to the IMM-ACK frame, the ENH-ACK frame 200 also comprises a MHR 202 and a MFR 204. However, the ENH-ACK frame 200 further comprises additional fields including addressing fields 212, an auxiliary security header (ASH) 216, information elements (IEs) 218 and a frame payload 220. The frame payload 220 and a portion of the IEs 218—payload IEs 218B—form a MAC payload 214. The addressing fields 212, the ASH 216 and the remainder of the IEs 218—header IEs 218A—form the MHR 202.

The ENH-ACK frame 200 comprises one or more packet processed fields (which may be referred to as software processed fields). Packet processed fields are those which require software processing to determine their calculated values. Therefore, a system or device generating and transmitting an ENH-ACK frame 200, may require system software to define, determine, process or calculate the contents of one or more packet processed fields of the ENH-ACK frame 200. For example, the ASH 216, IEs 218 and frame payload 220 may be considered together as an acknowledgement payload or a software-assisted acknowledgement payload. The fields of this acknowledgement payload may be described as packet processed fields in that system software is required to calculate values of the packet processed fields. The software processing can be slow and therefore, in some systems, meeting the 192 µs specification can be challenging, particularly for ENH-ACK frames fully generated by software.

Authentication and encryption are examples of the software processing that may be required for packet processed fields. For example, the header IEs 218A may require authentication and the payload IEs 218B may require authentication and encryption. In addition, the incoming packet may also require an authentication check and decryption. Implementing authentication and/or encryption adds further software processing time to the generation of the ENH-ACK frame 200 making the 192 µs requirement even more challenging.

In an example in which a system generates an entire ENH-ACK frame 200 using system software, the system software may take approximately 200 µs to authenticate and decrypt an incoming packet. The system software may take a further ~250 µs to prepare the encrypted ENH-ACK frame 200. Therefore, the system takes ~450 µs to generate the ENH-ACK frame 200, significantly exceeding the 192 µs requirement.

The present disclosure provides systems and methods of generating an ENH-ACK frame that can meet the 192 µs requirement while ensuring that values are provided for all packet processed fields. To achieve this, the system can rapidly populate header fields of the ENH-ACK frame based on an incoming packet and start transmitting the ENH-ACK frame: (i) before expiry of the 192 µs limit; and (ii) before values of the packet processed fields have been fully determined. The system can later define the contents of the packet processed fields and complete transmission of the ENH-ACK frame. The system can determine the contents of the packet processed fields as calculated values or fallback values (which may also be referred to as default values) depending on whether the processing is complete. If the system sends fallback values for one or more packet processed fields, the system can send a subsequent ENH-ACK frame with the calculated values when they have been processed.

Figure 3:
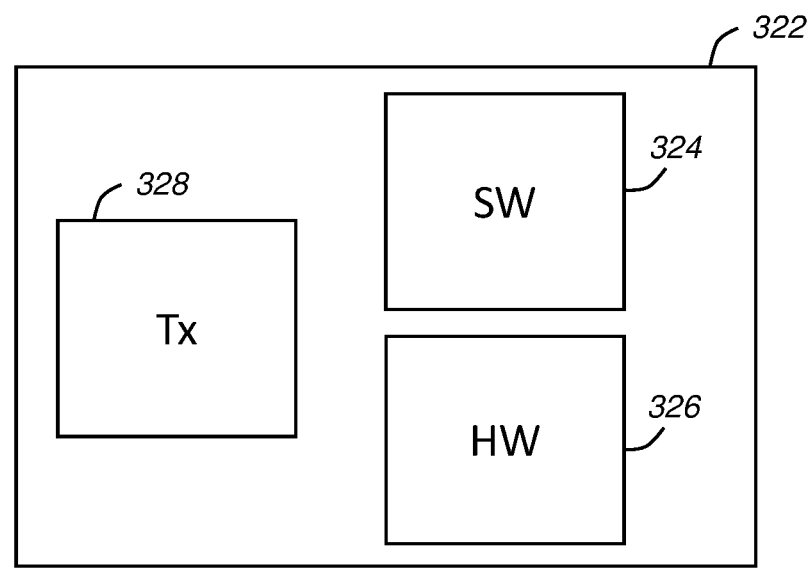
FIG. 3 illustrates a system according to an embodiment of the present disclosure.
Figure 4:
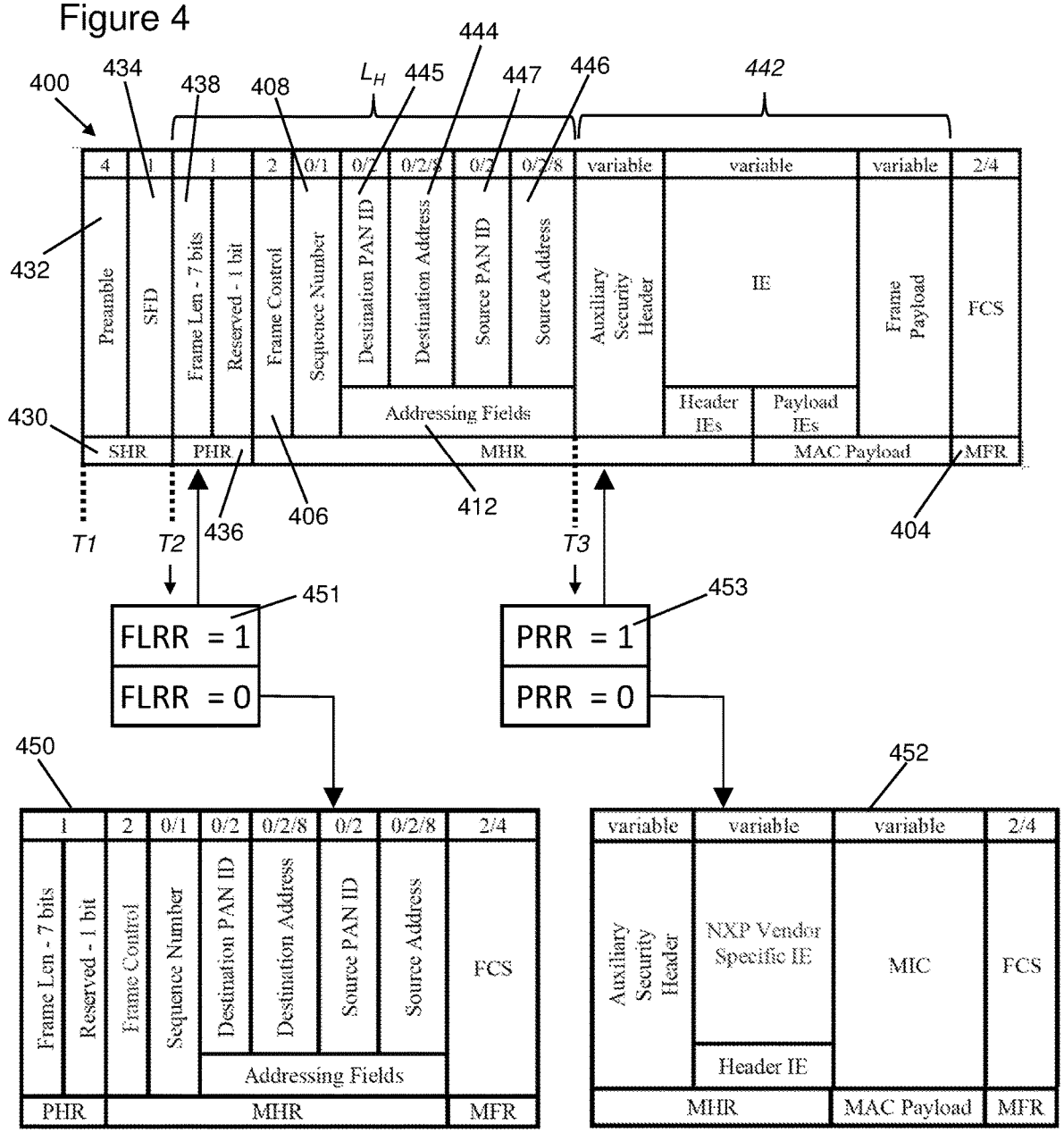
FIG. 4 illustrates an ENH-ACK frame and the preparation thereof by a system according to an embodiment of the present disclosure.

An example embodiment is now described with reference to FIGS. 3 and 4. FIG. 3 illustrates a system 322 for providing an ENH-ACK frame according to an embodiment of the present disclosure. FIG. 4 illustrates an example ENH-ACK frame 400 that may be transmitted by the system 322 and the preparation thereof. Features of FIG. 4 that also appear in FIG. 2 have been given corresponding reference numbers in the 400 series and will not necessarily be described again here.

The system 322 comprises system software 324 for processing incoming packets and generating the outgoing ENH-ACK frame 400. In this example, the system further comprises system hardware 326 for supporting the system software 324 with the processing of the incoming packets and the generation of the ENH-ACK frame 400. The system hardware 326 may comprise a hardware accelerator. The system hardware 326 is optional as in some examples the functionality of the system 322 may be fully implemented with the system software 324.

The system 322 is configured to receive an incoming packet from an external device. The system 322 determines that an ENH-ACK response is required based on information in the MHR of the incoming packet. The system 322 schedules transmission of the ENH-ACK frame to the external device in accordance with a standard turnaround time limit (192 µs). The system hardware 326 may schedule the transmission of the ENH-ACK frame 400. The system 322 determines contents of one or more packet processed fields (e.g. a frame length field 438, acknowledgement payload 442) and populates the packet processed fields prior to completing transmission of the ENH-ACK frame 400.

As explained above, packet processed fields are those which require software processing to determine their calculated values. Payload fields are typically packet processed fields whose values must be calculated by the system software 324. The system 322, particularly the system hardware 326, can schedule transmission of the ENH-Ack frame according to the turnaround time limit. The system 322 can schedule transmission of the ENH-Ack frame using a system clock in the system hardware. This can achieve precise over the air protocol timing. The system may mark a time stamp of a system clock (or start a timer) in response to the incoming packet and determine the turnaround time limit based on this timestamp (or timer). In some examples the system may mark a timestamp in response to receipt of the last symbol of the incoming packet. The standard turnaround time limit is then 192 µs after this time. In other examples, the system may mark a timestamp in response to receiving a predetermined symbol (such as the first symbol) of the incoming packet. The system may then determine a frame length of the incoming packet and calculate a last symbol time corresponding to receipt of the last packet of the incoming packet. The system can then determine the turnaround time limit as 192 µs after the last symbol time. The system hardware 326 can schedule transmission of the ENH-ACK frame 400 according to the turnaround time limit while the system determines the calculated values of the software process fields. In this way, the system may guarantee compliance with the turnaround time limit.

Header fields may require little or no processing and their values can be prepared by either the system software 324 or the system hardware 326. For example, the system software 324 or the system hardware 326 can read a value of the source address field 446 directly from a destination address field of the incoming packet or from a system registry. In this way, the system 322 can populate one or more header fields based on the MHR of the incoming packet or based on data in the system registry.

The ENH-ACK frame 400 comprises a synchronisation header (SHR) 430 and a physical layer packet header (PHR) 436. The SHR 430 comprises a preamble 432 and a synchronisation frame delimiter (SFD) 434. The PHR 436 comprises a frame length field 438 and a reserved bit 440.

The SHR 430, sequence number field 408 and addressing fields 412 are header fields that the system 322 can quickly populate based on data in the MHR of the incoming packet (e.g. destination address field 444) and/or data in a system registry (e.g. source address field 446).

As the SHR 430 is determined and populated quickly, the system 322 can begin transmission of the ENH-ACK frame, as scheduled in accordance with the turnaround time limit or turnaround deadline, even if the system software 324 has not yet calculated values of the packet processed fields (frame length field 438, acknowledgement payload 442). In this way, the system 322 can advantageously be guaranteed to meet the 192 µs turnaround time requirement regardless of the speed of the system software 324, the complexity of the acknowledgement payload 442 or its authentication and encryption.

In this example, the frame length field 438 and acknowledgement payload 442 are packet processed fields. The frame length field 438 is an example of a header field that is also a packet processed field in that software processing is required to calculate its value. A calculated frame length value of the frame length field 438 defines a frame length of the whole ENH-ACK frame 400. The system software 324 can only determine the calculated frame length after a payload length of the acknowledgment payload 442 has been determined. Therefore, as the acknowledgment payload 442 is a packet processed field, the frame length field 438 is also a packet processed field. However, the system software 324 can determine a payload length of the acknowledgement payload 442 and hence the calculated frame length prior to calculating the actual values (calculated payload values) of the acknowledgement payload 442. Therefore, the system software 324 can determine a calculated frame length of the frame length field 438 prior to determining calculated payload values of the acknowledgement payload 442.

As discussed below, following commencement of the ENH-ACK frame transmission, the system 322 can determine contents of the packet processed fields as calculated values or fallback values depending on whether the system software 324 has determined the calculated values prior to expiry of a calculation deadline. The system 322 can then populate the packet processed fields and complete transmission of the ENH-AK frame 400. If the system 322 transmits an ENH-ACK frame 400 with fallback values, the ENH-ACK frame 400 may include an indication that the system will transmit a further subsequent ENH-ACK frame once the system software 324 has determined the calculated values of the packet processed fields. In this way, the system 322 can guarantee meeting the turnaround time limit while ensuring the format of the ENH-ACK frame 400 is compliant with IEEE 802.15.4-2015.

As explained in detail below, the system 322 can prepare: an empty ENH-ACK field 450, with a fallback frame length of the frame length field 438, and/or a fallback acknowledgement payload 452. The fallback frame length of the frame length field 438 and the fallback acknowledgement payload 452 represent the fallback values of the packet processed fields. The system 322 can populate the ENH-ACK frame 400 with these fallback values upon expiry of a respective calculation deadline.

Figure 6:
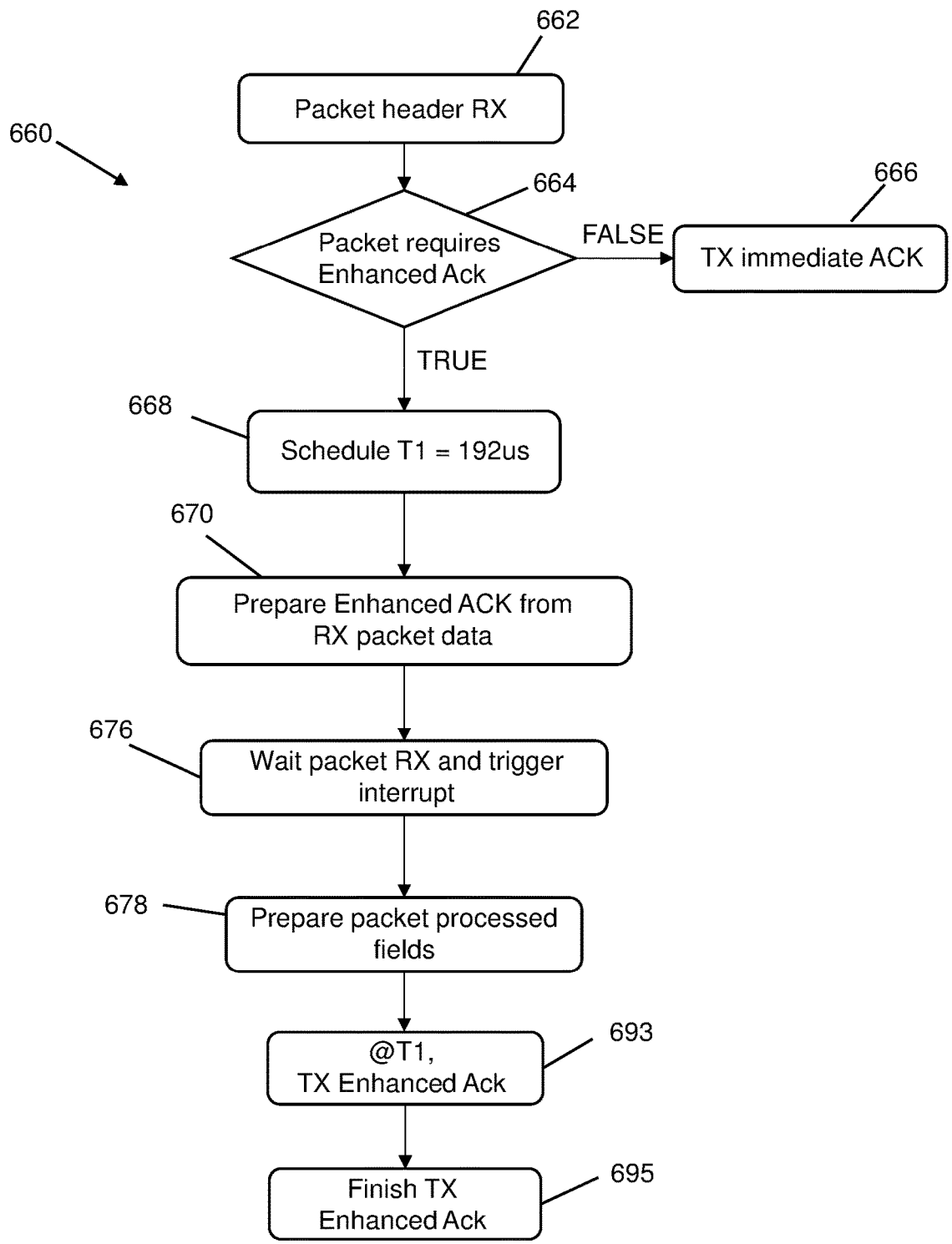
FIG. 6 illustrates a process of preparing an ENH-ACK frame according to a further embodiment of the present disclosure.

FIG. 6 illustrates an example process 660 of how the system of FIG. 3 can prepare the ENH-ACK frame 400 of FIG. 4. A description of the process 660 follows with continuing reference to the system 322 of FIG. 3 and the ENH-ACK frame 400 of FIG. 4.

All steps of the process 660 can be performed by the system software 324 or the system hardware 326, with the exception of step 678 which comprises software processing of the packet processed fields and is performed by the system software 324. The system hardware 326 can typically perform any particular step faster than the system software 324. In one embodiment, the system hardware 326 performs all operational steps of the system 322 with the exception of software frame processing steps 678.

At step 662, prior to the turnaround expiry time, T1, the system 322 receives a MHR of an incoming packet transmitted by an external device. The system 322 may comprise a transceiver 328 for receiving the incoming packet and transmitting outgoing packets. In other examples, the transceiver 328 may be located outside the system 322.

At decision point 664, the system 322 determines whether an ENH-ACK frame 400 is required to respond to the incoming packet based on data in the MHR of the incoming packet. For example, the system 322 may check: (i) whether a frame version sub-field of the frame control field of the incoming packet is set to 2; and (ii) whether a frame type sub-field of the frame control field of the incoming packet is set to MAC command or MAC data. In some examples, the system 322 can determine whether an ENH-ACK frame 400 is required following receipt of the MHR of the incoming packet and before the last symbol of the incoming packet has been received. The system 322 can determine whether an ENH-ACK frame 400 is required using the system hardware 326 which can make the determination faster than using the system software 324.

If the system 322 determines that an ENH-ACK response is not required, the system proceeds to step 666 and transmits an IMM-ACK frame.

If the system 322 determines that an ENH-ACK frame is required, the system proceeds to step 668 and the system 322 schedules transmission of the ENH-ACK frame in accordance with the turnaround time limit, T1, of 192 µs after receipt of the last symbol of the incoming packet according to IEEE 802.15.4-2015. The system may start a timer. Here, starting a timer may refer to starting an individual timer or may simply refer to the system marking or recording a timestamp of a system clock for use in determining one or more deadlines according to the system clock. In this way, the system 322 can start the timer in response to receipt of the incoming packet. In some examples, the system 322 may start the timer upon receipt of the MHR of the incoming packet and before the last symbol of the incoming packet has been received. Alternatively, the system 322 may start the timer later to coincide with receipt of the last symbol of the incoming packet. The system hardware 326 may start and/or provide the timer to provide a faster process.

At step 670, the system 322 can start preparing the ENH-ACK frame 400 based on data in the MHR of the incoming packet. The system 322 may prepare an ENH-ACK buffer for building the ENH-ACK frame 400. The ENH-ACK buffer may be provided by the system hardware 326 for a faster process.

The system 322 populates one or more header fields of the ENH-ACK frame 400 based on the MHR of the incoming packet. For example, the system 322 can populate at least a portion of one or more of: the SHR 430, the frame control field 406, the sequence number field 408 and the addressing fields 412 based on data in the MHR of the incoming packet and optionally based on data in a system registry. Some sub-fields of the one or more header fields may remain unpopulated, for example a frame-pending sub-field of the frame control field 406 which can indicate whether the external device can expect to receive a second or subsequent ENH-ACK frame. Population of the one or more header fields may be performed by the system hardware 326 for a faster process.

The system 322 can populate the addressing fields 412 based on the MHR of the incoming packet. For example, the system 322 can populate the destination address field 444, the destination PAN ID field 445, the source address field 446 and the source PAN ID field 447 based on the MHR of the incoming packet. In some examples, the system 322 can populate the source address field 446 and the source PAN ID field 447 based on data stored in a system registry of the system 322.

At step 676, the system 322 checks if a predetermined symbol of the incoming packet has been received and if not, the system awaits receipt of the predetermined symbol. The predetermined symbol may be the last symbol of the incoming packet or the last payload symbol of the incoming packet. The system hardware 326 may perform this check for a faster process.

Following receipt of the predetermined symbol, at step 678, the system 322 triggers an interrupt to instruct the system software 324 to commence frame processing. In other words, the system software 324 can commence processing the incoming packet to determine the calculated values of the packet processed fields. For example, the system software 324 may authenticate and decrypt a payload of the incoming packet, determine a payload length of the acknowledgement payload 442 (and thus a calculated frame length of the frame length field 438) and determine calculated payload values of the acknowledgement payload 442, including authenticating and encrypting the acknowledgement payload 442.

At step 693, the turnaround time limit, T1, expires and the system begins transmission of the ENH-ACK frame 400 as scheduled. At step 695 the system completes transmission of the ENH-ACK frame 400 with the packet processed fields determined in step 678.

Figure 7:
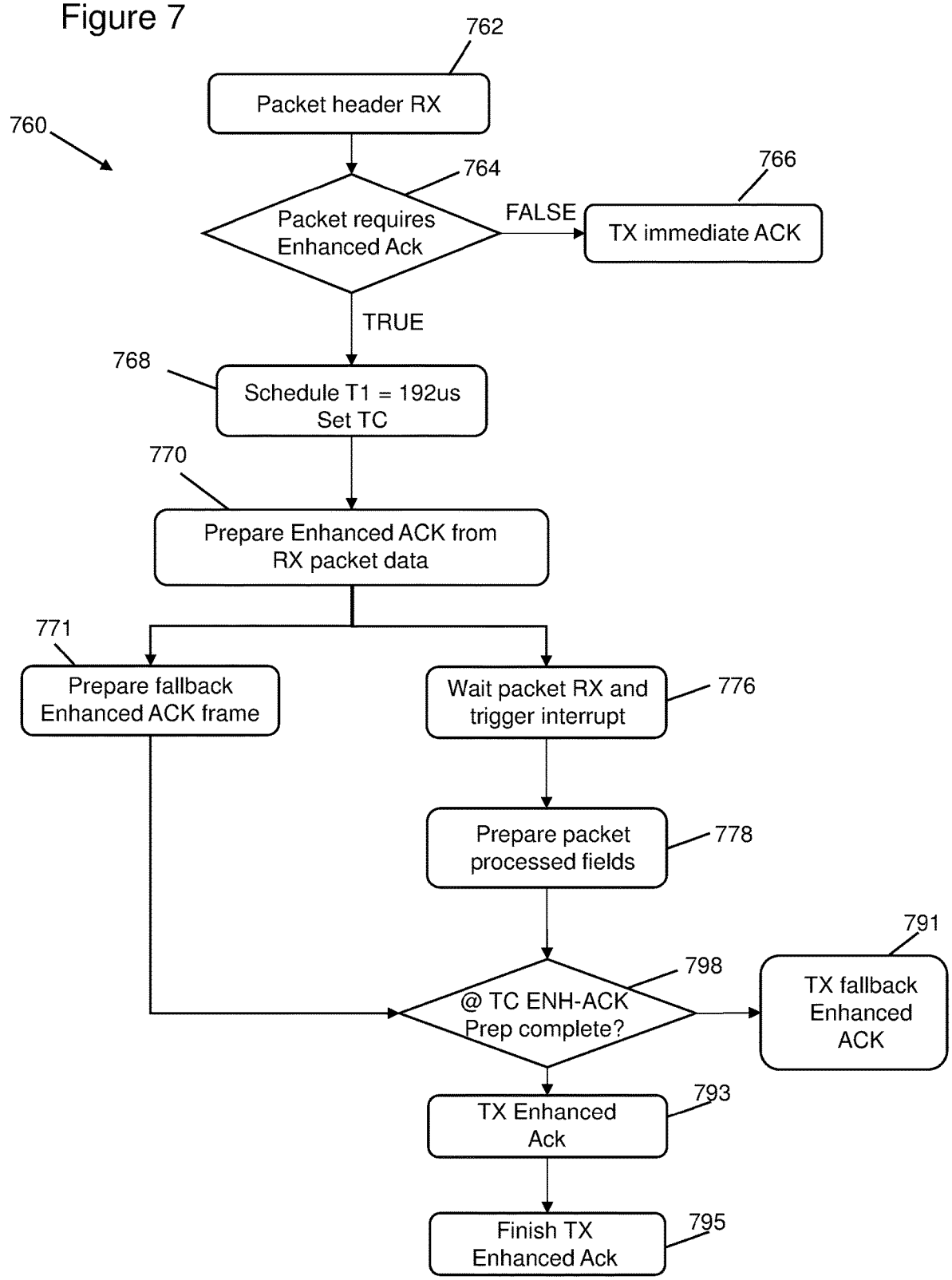
FIG. 7 illustrates a process of preparing an ENH-ACK frame according to a yet further embodiment of the present disclosure.

FIG. 7 illustrates a second example process 760 of how the system of FIG. 3 can prepare the ENH-ACK frame 400 of FIG. 4. A description of the process 760 follows with continuing reference to the system 322 of FIG. 3 and the ENH-ACK frame 400 of FIG. 4. Steps of the process 760 that appear in FIG. 6 have been given corresponding reference numbers in the 700 series and will not necessarily be described again here.

Steps 762, 764 and 766 are the same as steps 662, 664 and 666 and are as described above with respect to FIG. 6.

At step 768, the system 322 schedules transmission of the ENH-ACK frame 400 as described above in relation to step 668 of FIG. 6. The system 322 further sets a calculation deadline, TC, for calculating one or more packet processed fields.

The system 322 proceeds to step 770 and can populate one or more header fields as described above in relation to step 670 of FIG. 6.

Following step 770, the system 322 begins two parallel processes. Firstly, at step 771 the system 322 prepares a fallback ENH-ACK frame. The system hardware 326 may prepare the fall back ENH-ACK frame. The system can populate the fallback ENH-ACK frame with one or more fallback values for the packet processed fields. The fallback ENH-ACK frame represents a hardware assisted back-up frame should the system software fail to determine calculated values of the packet processed frames prior to the calculation deadline, TC. Specific examples, of fallback ENH-ACK frames are discussed below with respect to FIG. 5.

In parallel to step 771, the system 322 proceeds through steps 776 and 778 in the same manner as described above with respect to steps 676 and 678 of FIG. 6. At step 778, the system software 324 commences frame processing to determine the calculated values of the packet processed fields.

At step 798, the calculation deadline, TC, expires (as may be indicated by the system timer), the system 322 determines whether the system software 324 has completed determining the calculated values of the packet processed fields. If the system software 324 has determined the calculated vales of the packet processed fields, the system 322 proceeds through steps 793 and 795 and completes transmission of the ENH-ACK frame 400 in the same way as described for steps 693 and 695 in relation to FIG. 6.

If, at step 798, the system software 324 has failed to determine the calculated values of the packet processed fields, the system proceeds to step 791 and transmits the fallback ENH-ACK frame. This ensures that the system 322 still transmits a ENH-ACK frame as expected. Specific examples of fallback ENH-ACK frames are discussed below with corresponding calculation deadlines. In some examples, there may be more than one calculation deadline. In some examples the calculation deadline(s) may comprise a frame length calculation deadline, a payload calculation deadline and/or the turnaround time limit, T1.

Figure 5:
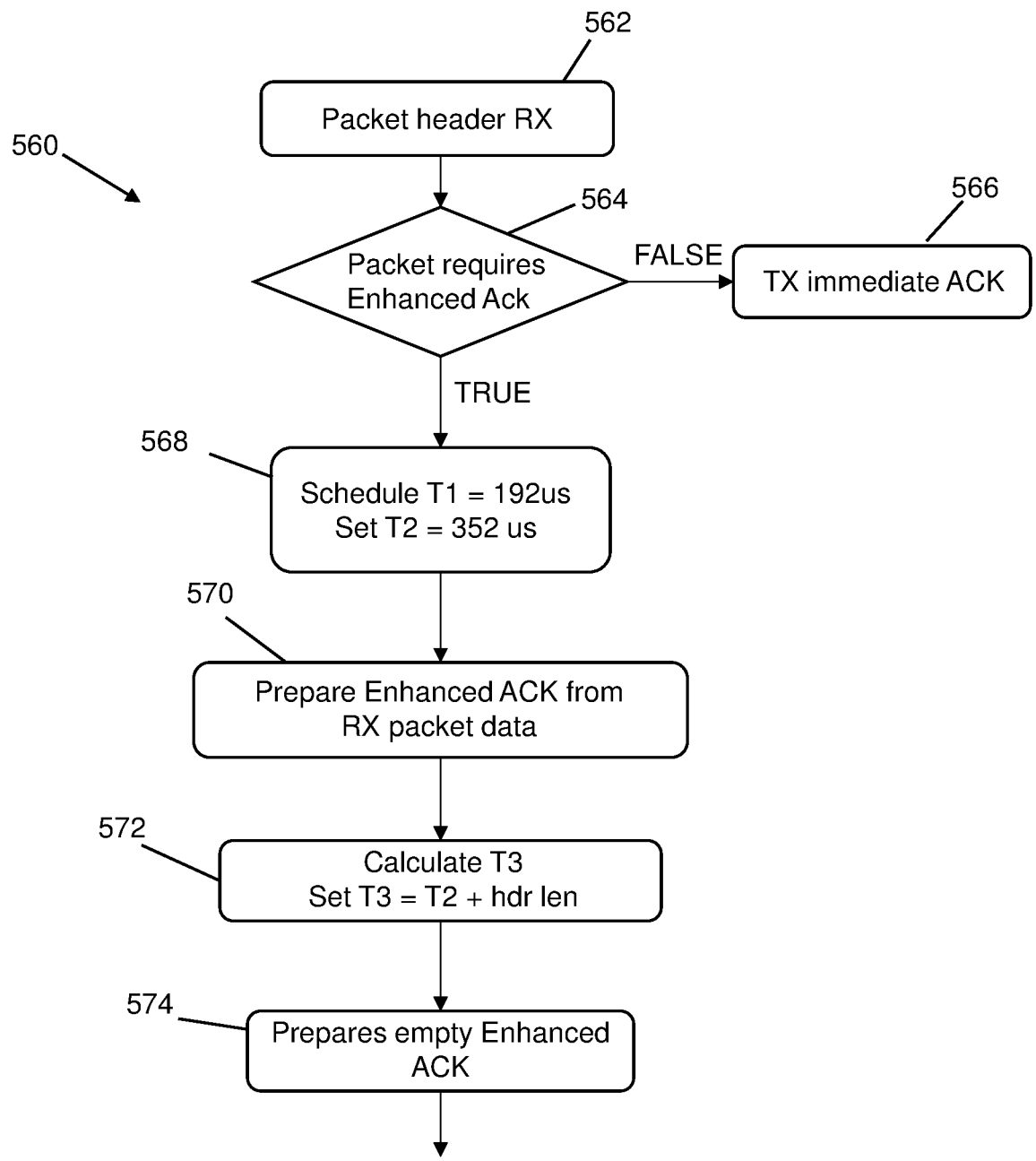
FIG. 5 illustrates a process of preparing an ENH-ACK frame according to an embodiment of the present disclosure.
Figure 5:
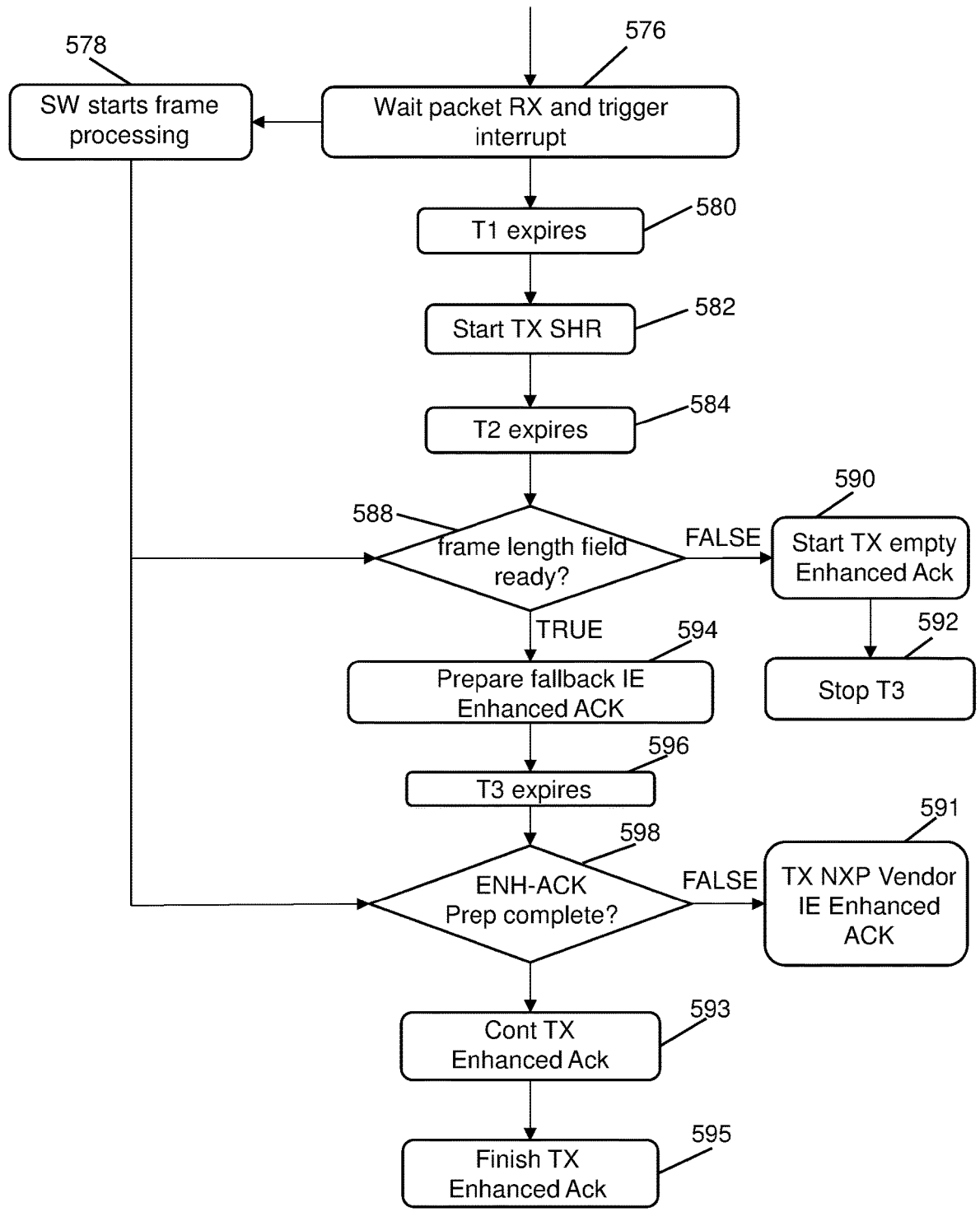

FIG. 5 illustrates a further example process 560 of how the system of FIG. 3 can prepare the ENH-ACK frame 400 of FIG. 4. A description of the process 560 follows with continuing reference to the system 322 of FIG. 3 and the ENH-ACK frame 400 of FIG. 4. FIG. 4 includes timings at the bottom of the ENH-ACK frame 400 that will assist in understanding of the process 560 of FIG. 5. The timings include the turnaround expiry time (T1=192 μs) and two calculation deadlines, T2, T3. The two calculation deadlines are a frame length calculation deadline, T2, and a payload calculation deadline, T3.

Steps of the process 560 that appear in FIG. 6 or FIG. 7 have been given corresponding reference numbers in the 500 series and will not necessarily be described again here.

All steps of the process 560 can be performed by the system software 324 or the system hardware 326, with the exception of the software frame processing step 578 which comprises software processing and is performed by the system software 324. The system hardware 326 can typically perform any particular step faster than the system software 324. In one embodiment, the system hardware 326 performs all operational steps of the system 322 with the exception of software frame processing steps 578.

At step 562, prior to the turnaround expiry time, T1, the system 322 receives a MHR of an incoming packet transmitted by an external device. The system 322 may comprise a transceiver 328 for receiving the incoming packet and transmitting outgoing packets. In other examples, the transceiver 328 may be located outside the system 322.

At decision point 564, the system 322 determines whether an ENH-ACK frame 400 is required to respond to the incoming packet based on data in the MHR of the incoming packet. For example, the system 322 may check: (i) whether a frame version sub-field of the frame control field of the incoming packet is set to 2; and (ii) whether a frame type sub-field of the frame control field of the incoming packet is set to MAC command or MAC data. In some examples, the system 322 can determine whether an ENH-ACK frame 400 is required following receipt of the MHR of the incoming packet and before the last symbol of the incoming packet has been received. The system 322 can determine whether an ENH-ACK frame 400 is required using the system hardware 326 which can make the determination faster than using the system software 324.

If the system 322 determines that an ENH-ACK response is not required, the system proceeds to step 566 and transmits an IMM-ACK frame.

If the system 322 determines that an ENH-ACK frame is required, the system proceeds to step 568 and the system 322 starts a timer. Here, starting a timer may refer to starting an individual timer or may simply refer to the system marking or recording a timestamp of a system clock for use in determining one or more deadlines according to the system clock. In this way, the system 322 can start the timer in response to receipt of the incoming packet. In some examples, the system 322 may start the timer upon receipt of the MHR of the incoming packet and before the last symbol of the incoming packet has been received. Alternatively, the system 322 may start the timer later to coincide with receipt of the last symbol of the incoming packet. The system hardware 326 may start and/or provide the timer to provide a faster process.

The system 322 may set one or more specific times that can be monitored with respect to the timer, such as the turnaround expiry time, T1, and the frame length calculation deadline, T2. The turnaround expiry time, T1, is equal to 192 µs after receipt of the last symbol of the incoming packet according to IEEE 802.15.4-2015. The frame length calculation deadline, T2, coincides with transmission of the last symbol of the SHR 430. A data length of the SHR 430 is predetermined as 5 bytes (4 bytes for preamble 432 and 1 byte for SFD filed 434). Therefore, a time taken to transmit the SHR 430 can be calculated based on the bit rate=5×8/bit rate. For a bit rate of 250 kbits/s, the transmission time of the SHR 430 is 160 µs and the frame length calculation deadline is therefore T2=T1+160=352 µs.

At step 570, the system 322 starts preparing the ENH-ACK frame 400 based on data in the MHR of the incoming packet. The system 322 may prepare an ENH-ACK buffer for building the ENH-ACK frame 400. The ENH-ACK buffer may be provided by the system hardware 326 for a faster process.

The system 322 populates one or more header fields of the ENH-ACK frame 400 based on the MHR of the incoming packet. For example, the system 322 can populate at least a portion of one or more of: the SHR 430, the frame control field 406, the sequence number field 408 and the addressing fields 412 based on data in the MHR of the incoming packet and optionally based on data in a system registry. Some sub-fields of the one or more header fields may remain unpopulated, for example a frame-pending sub-field of the frame control field 406 which can indicate whether the external device can expect to receive a second or subsequent ENH-ACK frame. Population of the one or more header fields may be performed by the system hardware 326 for a faster process.

The system 322 can populate the addressing fields 412 based on the MHR of the incoming packet. For example, the system 322 can populate the destination address field 444, the destination PAN ID field 445, the source address field 446 and the source PAN ID field 447 based on the MHR of the incoming packet. In some examples, the system 322 can populate the source address field 446 and the source PAN ID field 447 based on data stored in a system registry of the system 322.

FIG. 8 illustrates the bits of a frame control field according to IEEE 802.15.4-2015. The system can populate sub-fields of the frame control field 406 of the ENH-ACK frame 400 based on the MHR of the incoming packet as follows:
Frame type—always 010—indicating an acknowledgment frame;
Security enabled—always 1;
AR—always 0;
PAN ID compression—copied from MHR of incoming packet;
Sequence number suppression—copied from MHR of incoming packet;
Destination addressing mode—copied from source addressing mode of MHR of incoming packet;
Frame version—always 10;
Source addressing mode—use short addressing mode if short address is configured or extended otherwise.

The system 322 can populate the frame pending sub-field and can populate the IE present sub-field based on whether the system software 324 determines calculated values of the packet processed fields prior to one or more calculation deadlines. An initial value of the frame pending sub field may be set low (logic zero) and an initial value of the IE present sub field may be set high (logic one). The system can later overwrite one or both of these values using an overwrite register. Depending on implementation, other fields of the frame control field 406 may be associated with an overwrite register such that the process can cover use cases that supersede the IEEE 802.15.4-2015 specification.

At optional step 572, the system 322 determines the payload calculation deadline, T3. The payload calculation deadline coincides with transmission of the last symbol of the source address field 446. The system 322 may determine a header length, $L_H$, corresponding to a total length of the PHR 436, the frame control field 406, the sequence number field 408 and the addressing fields 412. The system 322 may determine the payload calculation deadline, T3, based on the header length, $L_H$, and a bit rate.

The header length, $L_H$, can vary because some fields may have a different length depending upon circumstances. For example, the destination address field 444 and source address field 446 may be 0, 2 or 8 bytes. As a result, the payload calculation deadline, T3, is determined after populating the one or more header fields in step 570. As an example, the header length, $L_H$, may be equal to a total of: 1 byte for the frame PHR 436, 2 bytes for the frame control fields 406, 1 byte for the sequence number field 408 and 2, 2, 2 and 8 bytes respectively for each of the four addressing fields 412=18 bytes. For a bit rate of 250 kbits/s, the payload calculation deadline is given by T3=T2+18×8/250=576 µs after expiry of T2, or 928 µs after receipt of the last symbol of the incoming packet.

In this example, step 572 immediately follows step 570, however determination of the header length, $L_H$, and/or determination of the payload calculation deadline, T3, may occur at any time before expiry of the frame length calculation deadline, T2. In some examples, determination of one or both of the header length, $L_H$, and the payload calculation deadline, T3, may not be required. Determination of the header length, $L_H$, and/or determination of the payload calculation deadline, T3, may be performed by the system hardware 326 for a faster process.

In this example, at step 574, the system 322 prepares an empty ENH-ACK frame 450. The system 322 may prepare the empty ENH-ACK frame 450 in an empty ENH-ACK buffer which may be provided in the system hardware 326. The system 322 may duplicate the populated header fields of the ENH-ACK frame 400 to the empty ENH-ACK frame 450. In this way, the empty ENH-ACK frame 450 may comprise the frame control field, sequence number field and addressing fields that were populated based on the incoming packet MHR in step 570. The system 322 may adjust three sub-fields of the frame control field of the empty ENH-ACK frame 450: (i) the frame pending sub-field may be set (to one), indicating that a subsequent ENH-ACK frame will be transmitted; (ii) a IE present field may be unset (to zero), indicating that the empty ENH-ACK frame does not include an IE Field (acknowledgement payload); and (iii) the security enabled field may be unset (to zero) indicating the ENH-ACK frame is not protected. The system 322 may populate the frame length field of the empty ENH-ACK frame 450 with a fallback frame length value based on the header length, $L_H$. The fallback value may be equal to the total length of the empty ENH-ACK frame ($L_H$+length of MFR). As explained below, this empty ENH-ACK frame 450 may be transmitted to the external device as a compliant ENH-ACK frame if the system software 324 fails to determine a calculated frame length of the frame length field 438 prior to the frame length calculation deadline, T2.

At step 576, the system 322 checks if a predetermined symbol of the incoming packet has been received and if not, the system awaits receipt of the predetermined symbol. The predetermined symbol may be the last symbol of the incoming packet or the last payload symbol of the incoming packet. The system hardware 326 may perform this check for a faster process.

Following receipt of the predetermined symbol, at step 578, the system 322 triggers an interrupt to instruct the system software 324 to commence frame processing. In other words, the system software 324 can commence processing the incoming packet to determine the calculated values of the packet processed fields. For example, the system software 324 may authenticate and decrypt a payload of the incoming packet, determine a payload length of the acknowledgement payload 442 (and thus a calculated frame length of the frame length field 438) and determine calculated payload values of the acknowledgement payload 442, including authenticating and encrypting the acknowledgement payload 442.

The system 322 may provide a first packet RAM buffer to the system software 324 for populating the calculated frame length and may provide a second packet RAM buffer for populating the acknowledgement payload 442. At step 578, the system software 324 can determine the calculated frame length of the frame length field 438 and can determine the calculated values of the acknowledgement payload 442. The system software 324 may further authenticate and/or encrypt the acknowledgement payload 442.

The system registry may contain one or more registers for indicating whether calculated values of the packet processed fields have been calculated. For example, the system registry may comprise a frame length ready register 451. The system software 324 can set the frame length ready register 451 to a high value (one) following determination of the payload length of the acknowledgement payload and/or the calculated frame length of the frame length field 438. The system registry may comprise a payload ready register. The system software 324 can set the payload ready register 453 to a high value following determination of the calculated payload values of the acknowledgement payload 442. Determining the calculated payload values may comprise determining the calculated bytes of the payload and optionally authenticating and/or encrypting the calculated bytes.

Meanwhile, at step 580 the timer indicates when the turnaround expiry time, T1, is reached. The turnaround expiry time, T1, is 192 μs after receipt of the last symbol of the incoming packet according to IEEE 802.15.4-2015.

On or before expiry of the turnaround expiry time, T1, the system commences transmission of the ENH-ACK frame 400 as scheduled. The system 322 may transmit the ENH-ACK frame 400 using the transceiver 328. At step 582, the system 322 can begin transmitting the SHR 430, as scheduled, because values of the SHR 430 were determined and populated at step 570 based on data from the MHR of the incoming packet and/or data from the system registry.

After commencing transmission of the ENH-ACK frame 400, the first packet processed field that the system 322 transmits is the frame length field 438. As discussed above, to determine the calculated frame length of the frame length field 438, the system software 324 first determines a payload length of the acknowledgement payload 442. The system 322 can then determine the calculated frame length based on the payload length and the header length, $L_H$. The system 322 determines the contents of the frame length field 438 prior to or on expiry of the frame length calculation deadline, T2.

At step 584, the frame length calculation deadline, T2, expires and at step 588, the system 322 checks the status of the ongoing software processing of step 578. In particular, the system 322 determines if the system software 324 has determined the payload length of the acknowledgement payload 442 and/or the calculated frame length of the frame length field 438. The system 322 may check the frame length ready register 451 to determine the contents of the frame length field 438.

If the frame length ready register 451 is low (zero), indicating that the system software has not yet determined the calculated frame length, the system proceeds to step 590 and completes transmission of the ENH-ACK frame 400 by transmitting the contents of the empty ENH-ACK frame 450. In this way, the system 322 determines the contents of the frame length field 438 as the fallback frame length if the system software 324 fails to determine the calculated frame length prior to expiry of the frame length calculation deadline, T2.

In some examples, the system 322 may not prepare an empty ENH-ACK frame 450 in step 572 or transmit the empty ENH-ACK frame 450 in step 590. Instead, the system 322 may provide a frame length buffer for the frame length field 438. The system 322 can then determine the contents of this frame length field 438 as the calculated frame length or the fallback frame length based on the frame length ready register 451 and populate the ENH-ACK frame 400 accordingly. In such an example, the system removes the acknowledgement payload 442 from the ENH-ACK frame 400 in the ENH-ACK buffer which then becomes identical to the empty ENH-ACK frame 450. In such an example, the system 322 also sets the frame pending sub-field of the frame control field 406 to a high value and sets the IE present sub-field of the frame control field 406 to a low value. In some examples, the system 322 may not provide a buffer for the frame length field and instead the system 322 can modify the frame length field and the IE present and frame pending sub-fields on the fly.

In yet other examples, steps 574, 584, 588, 590 and 592 may be omitted because the system software 324 operates at a sufficient speed that the calculated frame length is always expected to be ready (frame length ready register is high) upon expiry of the frame length calculation deadline, T2.

Following transmission of the empty ENH-ACK frame 450, the system 322 stops the timer at step 592. The system 322 continues to determine the contents of the packet processed fields. In particular the system software 324 continues to determine the calculated payload values of the acknowledgement payload 442. The system 322 then transmits a further ENH-ACK frame containing the calculated payload values of the acknowledgment payload 442 subsequent to transmission of the empty ENH-ACK frame 450. As the frame pending sub-field of the empty ENH-ACK frame 450 is set to a high value, the external device receiving the empty ENH-ACK frame 450 receives an indication that a further ENH-ACK frame will be transmitted. The external device can then remain in a listening mode until it receives the further ENH-ACK frame.

If at step 588, the frame length ready register 451 indicates that the calculated frame length is available, the system 322 populates the frame length field 438 with the calculated frame length. In this way, the system 322 determines the contents of the frame length field 438 as a calculated frame length if the system 322 determines the calculated frame length prior to expiry of the frame length calculation deadline, T2. The system 322 may set the IE present subfield, and may unset the frame pending subfield, of the frame control field 406.

The system 322 then continues transmission of the ENH-ACK frame 400 by transmitting the calculated frame length in the frame length field 438 of the PHR 436. The system 322 continues to transmit the header fields determined at step 570—the frame control field 406, the sequence number field 408 and the addressing fields 412.

At this stage, the system 322 may also determine the payload calculation deadline, T3, if it was not determined at step 572.

At step 594, the system 322 may prepare a fallback acknowledgement payload 452. The fallback acknowledgement payload 452 may be a vendor defined fallback ENH-ACK payload. In this example, the fallback acknowledgement payload 452 comprises a MHR including a ASH and a header IE. The header IE includes a vendor specific IE. The fallback acknowledgement payload 452 further comprises a MAC payload having message integrity code (MIC) and a MFR. The ASH and the MIC may be required for authentication. The system 322 may set values of the header IE to null data and set a length of the header IE such that a fallback payload length of the fallback acknowledgement payload 452 corresponds to the calculated payload length/frame length determined by the system software 324 at step 578.

At step 596, the payload calculation deadline, T3, expires and the process proceeds to step 598 during which the system 322 determines whether calculated values of the acknowledgement payload 442 have been determined by the system software 324. The system 322 may check the payload ready register 453 to check if the system software 324 has determined the calculated payload values of the acknowledgement payload 442.

If the payload ready register 453 is low (zero), indicating that the system software has not yet determined the calculated payload values, the system proceeds to step 591 and completes transmission of the ENH-ACK frame 400 by transmitting the contents of the fallback acknowledgement payload 452. In this way, the system 322 determines the contents of the acknowledgement payload 442 as a fallback acknowledgement payload 452 if the system 322 fails to determine the calculated payload values prior to expiry of the payload calculation deadline, T3. Transmission of the fallback acknowledgment payload 452 completes transmission of the ENH-ACK frame 400.

Following transmission of the fallback acknowledgement payload 450, the system 322 continues to determine the calculated payload values of the packet processed fields. The system 322 can then transmits a further ENH-ACK frame containing the calculated payload values of the acknowledgment payload 442 subsequent to the ENH-ACK frame 400. If frame pending sub-field of the frame control field was transmitted (prior to transmission of the fallback acknowledgement payload 450) with a value set to high, the external device receiving the ENH-ACK frame 400 with the fallback acknowledgement payload 452 receives an indication that a further ENH-ACK frame will be transmitted. The external device can then remain in a listening mode until it receives the further ENH-ACK frame. In a case where the frame pending sub-field was already transmitted with a low value, only the fallback acknowledgement payload 450 may be transmitted. The external device can send another Data Request in order to receive the Payload Enhanced Ack (400). The fallback acknowledgement payload 450 may contain an instruction to the external device to send the further data request.

If at step 598, the payload ready register 453 indicates that the calculated payload values are available, the system 322 continues to step 593 and populates the acknowledgement payload 442 with the calculated payload values. In this way, the system 322 determines the contents of the acknowledgement payload 442 as calculated payload values if the system 322 determines the calculated payload values prior to expiry of the payload calculation deadline, T3. At step 595, the MFR 404 is transmitted to complete transmission of the ENH-ACK frame 400.

In some embodiments, a fallback acknowledgement payload 452 may not be required. In other words, process steps 572, 594, 596, 598 and 591 may be omitted. In such examples, if the system software 324 is able to determine the calculated frame length prior to the frame length calculation deadline, T2, it follows that the system will always be able to determine the calculated payload values of the acknowledgement payload 442 before expiry of the payload calculation deadline, T3. Therefore, the process only requires decision point 588 to determine whether to transmit an empty ENH-ACK frame 452 but if the frame length registry is high then the calculated acknowledgement payload values will also be available on time.

In some examples, the system may comprise configuration modes for selecting whether one or both of decision points 588 and 598 are applied at corresponding deadlines T2 and T3. The selection of a configuration modes may be based on processor frequency or on the presence of some hardware crypto accelerators etc.

In any of the processes, 500, 600, 700, the system may abort transmission of an ENH-ACK frame should the transmitter as a resource become unavailable.

One or more of all the steps of the processes 500, 600, 700 with the exception of the software processing step 578, 678, 778 may be implemented using the system hardware 326. For example, a hardware accelerator may be used to perform one or more of the steps to improve the speed of the process. In other examples, one or more of the steps or the entire process may be implemented using the system software 324.

The present disclosure provides systems and methods that can advantageously combine software processing with some hardware rules for making possible a short turnaround time for an enhanced acknowledgment frame. Beneficially, one or more fallback mechanisms can maintain backward-compatibility with other IEEE802.15.4 devices. The systems and methods provide for acceleration of the generation of an ENH-Ack frame that can obtain improved results when coupled with a hardware accelerator.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A system for providing an enhanced acknowledgement (ENH-ACK) frame, the system configured to:
   receive an incoming packet transmitted by an external device;
   determine that an ENH-ACK response is required based on a MAC header of the incoming packet;
   schedule transmission of the ENH-ACK frame to the external device in accordance with a standard turn-around time limit relative to receipt of the incoming packet;
   determine contents of one or more packet processed fields of the ENH-ACK frame and populate the one or more packet processed fields; and
   complete transmission of the ENH-ACK frame with the populated packet processed fields,
   wherein the system is configured to determine the contents of the one or more packet processed fields as:
      calculated values of the one or more packet processed fields if system software determines the calculated values prior to expiry of a corresponding calculation deadline; or
      fallback values if the system software fails to determine the calculated values of the one or more packet processed fields prior to expiry of the corresponding calculation deadline,
      wherein the one or more calculation deadlines comprise a frame length calculation deadline and a payload calculation deadline.

2. The system of claim 1 wherein the system is further configured to populate one or more header fields of the ENH-ACK frame based on the MAC header of the incoming packet.

3. A system for providing an enhanced acknowledgement (ENH-ACK) frame, the system configured to:
   receive an incoming packet transmitted by an external device;
   determine that an ENH-ACK response is required based on a MAC header of the incoming packet;
   schedule transmission of the ENH-ACK frame to the external device in accordance with a standard turn-around time limit relative to receipt of the incoming packet;
   determine contents of one or more packet processed fields of the ENH-ACK frame and populate the one or more packet processed fields; and
   complete transmission of the ENH-ACK frame with the populated packet processed field,
   wherein the one or more packet processed fields comprise a frame length field and the system is configured to determine the contents of the frame length field as:
      a calculated frame length if system software determines the calculated frame length prior to expiry of a frame length calculation deadline; and
      a fallback frame length if the system software fails to determine the calculated frame length prior to expiry of the frame length calculation deadline.

4. The system of claim 3, wherein the calculated frame length is based on a total length of header fields and a payload length of an acknowledgment payload.

5. The system of claim 3, wherein if the system software fails to determine the calculated frame length prior to expiry of the frame length calculation deadline the system is configured to complete transmission of the ENH-ACK frame as an empty ENH-ACK frame without an acknowledgement payload.

6. The system of claim 5, wherein the one or more header fields include a frame control field and the system is configured to:
set a frame pending flag of the frame control field;
transmit a payload ENH-ACK frame including an acknowledgement payload subsequent to transmission of the empty ENH-ACK frame and after calculated values of the frame length field and the acknowledgement payload have been determined.

7. A system for providing an enhanced acknowledgement (ENH-ACK) frame, the system configured to:
receive an incoming packet transmitted by an external device;
determine that an ENH-ACK response is required based on a MAC header of the incoming packet;
schedule transmission of the ENH-ACK frame to the external device in accordance with a standard turnaround time limit relative to receipt of the incoming packet;
determine contents of one or more packet processed fields of the ENH-ACK frame and populate the one or more packet processed fields; and
complete transmission of the ENH-ACK frame with the populated packet processed field,
wherein the one or more packet processed fields comprise an acknowledgment payload, and the system is configured to determine the contents of the acknowledgment payload as:
calculated payload values of the acknowledgment payload if system software determines the calculated payload values prior to expiry of a payload calculation deadline; and
a fallback payload if the system software fails to determine the calculated payload values of the acknowledgment payload prior to expiry of the payload calculation deadline.

8. The system of claim 7, wherein the one or more header fields include a frame control field and if the system software fails to determine the calculated payload values prior to expiry of the payload calculation deadline, the system is configured to:
set a frame pending flag of the frame control field; and
transmit a payload ENH-ACK frame including calculated payload values of the acknowledgement payload subsequent to transmission of the ENH-ACK frame and after the calculated payload values have been determined.

9. The system of claim 7, wherein the system software is configured to determine a calculated payload length of the acknowledgement payload and wherein a fallback payload length of the fallback payload is based on the calculated payload length.

10. A system for providing an enhanced acknowledgement (ENH-ACK) frame, the system configured to:
receive an incoming packet transmitted by an external device;
determine that an ENH-ACK response is required based on a MAC header of the incoming packet;
schedule transmission of the ENH-ACK frame to the external device in accordance with a standard turnaround time limit relative to receipt of the incoming packet;
determine contents of one or more packet processed fields of the ENH-ACK frame and populate the one or more packet processed fields; and
complete transmission of the ENH-ACK frame with the populated packet processed field, the system comprising system hardware and system software, wherein:
the system software is configured to perform one or more software frame processing steps to determine calculated values of the packet processed fields; and
the system is configured to perform one or more or all of the other system operation steps using the system hardware,
wherein the software frame processing steps comprise one or more of:
authenticating the incoming packet;
decrypting the incoming packet;
determining a calculated payload length of the acknowledgment payload;
determining a calculated frame length of the ENH-ACK frame;
determining calculated payload values of the acknowledgement payload;
authenticating the acknowledgement payload; and
encrypting the acknowledgement payload.

11. A radio comprising the system of claim 1.

12. A system on chip comprising the radio of claim 11.

13. A method for providing an enhanced acknowledgement (ENH-ACK) frame, the method comprising the steps:
receiving an incoming packet transmitted by an external device;
determining that an ENH-ACK response is required based on a MAC header of the incoming packet;
scheduling transmission of the ENH-ACK frame to the external device in accordance with a standard turnaround time limit relative to receipt of the incoming packet;
determining contents of one or more packet processed fields of the ENH-ACK frame and populating the one or more packet processed fields; and
completing transmission of the ENH-ACK frame,
wherein determining the contents of the one or more packet processed fields comprises:
calculating values of the one or more packet processed fields if system software determines the calculated values prior to expiry of a corresponding calculation deadline; or
using fallback values if the system software fails to determine the calculated values of the one or more packet processed fields prior to expiry of the corresponding calculation deadline,
wherein the one or more calculation deadlines comprise a frame length calculation deadline and a payload calculation deadline.

14. The system of claim 1 further comprising system software, wherein the system is configured to perform all operations using one or more system processors to execute the system software.

15. The system of claim 1, wherein the system comprises a system clock and the system is configured to schedule transmission of the ENH-ACK frame based on the system clock.

16. The system of claim 15, wherein the system is configured to determine a symbol arrival time of a predetermined symbol of the incoming packet using the system clock and determine the standard turnaround time limit based on the symbol arrival time.

17. The system of claim 1, wherein the one or more calculation deadlines are implemented depending on a speed of a processor of the system.

* * * * *